United States Patent [19]

Schafer

[11] Patent Number: 5,542,038
[45] Date of Patent: Jul. 30, 1996

[54] METHOD AND SYSTEM FOR GENERATING DYNAMIC ZOOM CODES

[75] Inventor: John C. Schafer, Wylie, Tex.

[73] Assignee: Cirrus Logic, Inc., Fremont, Calif.

[21] Appl. No.: 98,840

[22] Filed: Jul. 29, 1993

[51] Int. Cl.[6] .................................................. G06T 3/40
[52] U.S. Cl. ........................................ 395/139; 395/128
[58] Field of Search .................................. 395/133, 136, 395/139, 141, 127, 128; 345/127, 129, 130, 131; 382/47; 341/148

[56] References Cited

U.S. PATENT DOCUMENTS

| Re. 31,200 | 4/1983 | Sukonick et al. | 395/139 X |
|---|---|---|---|
| 4,533,910 | 8/1985 | Sukonick et al. | 395/139 X |
| 4,947,342 | 8/1990 | Katsura et al. | 395/139 X |
| 5,187,776 | 2/1993 | Yanker | 395/139 X |
| 5,301,265 | 4/1994 | Itoh | 395/139 X |
| 5,335,296 | 8/1994 | Larkin et al. | 395/139 X |
| 5,384,904 | 1/1995 | Sprague et al. | 395/139 |

*Primary Examiner*—Almis R. Jankus
*Attorney, Agent, or Firm*—Fulbright & Jaworski

[57] ABSTRACT

Circuitry for altering a received data stream as a function of a received factor, the received factor indicative of an output format of the received data stream. Included within the circuitry is a first circuit operable to selectively expand portions of the received data stream as a function of the received factor. Further included within the circuitry is a second circuit operable to dynamically generate a zoom code associated with a selected portion of the received data stream, the zoom code providing direction to an associated device for completing the generation of the output format.

25 Claims, 5 Drawing Sheets

EXAMPLE FOR WINDOW 31 - ZOOM UP

ZOOM FACTOR 256/192 = 4/3

LINEAR RESAMPLING

| $SP_{00}$ | $SP_{10}$ | $SP_{20}$ | $SP_{30}$ | $SP_{40}$ | $SP_{50}$ | $SP_{60}$ |
|---|---|---|---|---|---|---|
| 0 | 1 | 2 | 3 | 4 | 5 | 6 |
| X | X | X | X | X | X | X |

X      X      X      X      X      X      X      X      X (.75) (1.5) (2.25) (3.0) (3.75) (4.5) (5.25) (6.0)

$DP_{00}$  $DP_{10}$  $DP_{20}$  $DP_{30}$  $DP_{40}$  $DP_{50}$  $DP_{60}$  $DP_{70}$  $DP_{80}$

.75 = STOP SIZE

0 = STARHNS SOURCE PIXEL $SP_{00} \rightarrow SP_{60}$ = SOURCE PIXELS 00-60

$DP_{00} \rightarrow DP_{80}$ = DESTINATION PIXELS 00-80

$DP_{00} = SP_{00}$ $DP_{10} = (.75 \times SP_{10}) + (.25 \times SP_{00})$ $DP_{20} = (.5 \times SP_{20}) + (.5 \times SP_{10})$ $DP_{30} = (.75 \times SP_{30}) + (.25 \times SP_{20})$     •
    •
    •

| ZOOM CODE | | LINEAR INTERPOLATION CASE | |
|---|---|---|---|
| ZC<3:2> | ZC<1:0> | SECOND DISPLAY PIXEL 1 | FIRST DISPLAY PIXEL 0 |
| 00 | 00 | $PIX_n$ | $PIX_n$ |
| 00 | 01 | NOT USED | NOT USED |
| 00 | 10 | $PIX_{n+2}$ | $PIX_{n+1}$ |
| 00 | 11 | $PIX_{n+2}$ | $(PIX_{n+1} + PIX_{n+2})/2$ |
| 01 | 00 | $(PIX_n + PIX_{n+1})/2$ | $PIX_n$ |
| 01 | 01 | $(PIX_n + PIX_{n+1})/2$ | $(PIX_n + PIX_{n+1})/2$ |
| 01 | 10 | NOT USED | NOT USED |
| 01 | 11 | $(PIX_{n+2} + PIX_{n+3})/2$ | $(PIX_{n+1} + PIX_{n+2})/2$ |
| 10 | 00 | $PIX_{n+1}$ | $PIX_n$ |
| 10 | 01 | $PIX_{n+1}$ | $(PIX_n + PIX_{n+1})/2$ |
| 10 | 10 | $PIX_{n+1}$ | $PIX_{n+1}$ |
| 10 | 11 | NOT USED | NOT USED |
| 11 | 00 | BLANK | BLANK |
| 11 | 01 | $(PIX_{n+1} + PIX_{n+2})/2$ | $(PIX_n + PIX_{n+1})/2$ |
| 11 | 10 | $(PIX_{n+1} + PIX_{n+2})/2$ | $PIX_{n+1}$ |
| 11 | 11 | $(PIX_{n+1} + PIX_{n+2})/2$ | $(PIX_{n+1} + PIX_{n+2})/2$ |

*FIG. 6*

METHOD AND SYSTEM FOR GENERATING DYNAMIC ZOOM CODES

TECHNICAL FIELD OF THE INVENTION

The present invention is directed in general to signal processing, and more specifically, to displaying multiple data streams in a desired output format on a single display device.

CROSS-REFERENCE TO RELATED APPLICATIONS

The following copending and coassigned United States patent applications contain related material and are incorporated herein by reference:

U.S. patent application Ser. No. 08/099,083 entitled "System And Method For Processing Multiple Received Signal Sources," filed concurrently herewith;

U.S. patent application Ser. No. 08/099,716 entitled "System And Method For Displaying Multiple Data Screens To A Single Display Device," filed concurrently herewith;

U.S. Pat. No. 5,488,390 entitled "Apparatus, Systems, And Methods For Displaying A Cursor On A Display Screen," filed concurrently herewith;

U.S. patent application Ser. No. 08/099,223 entitled "Method And System For Attaching Dynamic Control Codes To Received Real-Time Data Streams," filed concurrently herewith;

U.S. patent application Ser. No. 08/098,846 entitled "A System And Method For The Mixing Of Graphics And Video Signals," filed concurrently herewith;

U.S. patent application Ser. No. 08/099,194 entitled "Video Processing Apparatus, Systems And Methods," filed concurrently herewith, now abandoned;

U.S. patent application Ser. No. 08/09,835 entitled "Method And System For Achieving Full Monotonic Signal Conversion," filed concurrently herewith; and U.S. Pat. No. 5,410,311 entitled "A Voltage Reference And Current Source For Video DAC," filed concurrently herewith.

BACKGROUND OF THE INVENTION

In today's information processing/multimedia society there exists a continuous quest for richer human-machine interaction. This is particularly evident in the real-time video/graphics processing environment where the focus has been on more realistic computer-generated image presentations.

The objective has been to produce computer-generated images which are so realistic that the observer believes the image to be that of a real object rather than a synthetic object existing within a computer memory. Coupled with this is a desire to free the user from the confines of traditional real-time computer systems, and consequently enabling the user to dynamically manipulate the appearance of particular displayed real-time images through transforming the images into a desired output format.

Contemporary real-time display technologies generally employ a window-generating scheme which assigns a distinct display window to each displayed data stream. By controlling the display windows, the window generator controls the individual data streams. Each display window is therefore a virtual screen, or "mini-monitor," responsible for displaying a single real-time data stream.

Most all schemes employ some form of a zooming mechanism for individually altering particular ones of a received video/graphics image. The problem encountered with existing enlargement schemes is that the transformed image often appears "choppy," i.e., edges which should appear as smooth curves instead appear with squared corners. A further problem confronted is that the simultaneous, or near simultaneous, manipulation of one or more of the multiple images severely impacts the ability of the scheme to maintain the associated images in real-time.

Thus, the clear rigidity of these schemes fails to provide a flexible environment in which a user is capable of dynamically manipulating a display image screen upon which multiple real-time data streams are being displayed. Accordingly, these schemes are incapable of meeting fundamental user needs.

Therefore, there exists a need in the art for a system and method for generating zoom codes for multiple integrated graphics and video data streams which enables the user to create a desired output format.

There exists a further need in the art for a system and method for generating zoom codes for separately manipulating multiple real-time data streams displayed within a windowing scheme which is flexible enough to meet an expanding variety of user needs.

There exists a still further need in the art for a system and method for generating zoom codes for realistically displaying information contained within multiple received video and graphics data streams to a single display device.

SUMMARY OF THE INVENTION

These and other needs and features are achieved by the present invention which enables the altering of a received data stream as a function of a received factor, wherein the factor is indicative of a desired output format of the received data stream.

In one embodiment, the invention utilizes both expansion circuitry and generator circuitry. The generator circuitry is operable to selectively expand portions of the received data stream as a function of the received factor, while the generation circuitry is operable to dynamically generate a distinct zoom code which is associated with a particular portion of the received data stream. The zoom code provides direction for improving the desired output format of the particular associated portion. This is accomplished through the interpolation of each of the transmitted portions of the received data stream by an associated circuit as a function of, or in response to, the associated distinct zoom code.

In a second embodiment, the invention is implemented within a system which is capable of receiving a plurality data streams along with a plurality of factors. Each of the factors is associated with at least one of the received data streams, and is indicative of the desired output format of its associated data stream(s). The system is operable to selectively alter each of the received data streams as a function of each data stream's associated factor(s). The system includes both a processing unit and a display device, wherein the processing unit is operable for relaying each of the data streams to the display device.

In a third embodiment, the invention is implemented within a computer system, which may be a personal computer system wherein one or more data streams are received and are representative of data from a program running within the computer system or communicated to the computer system from an external source, such as telecommunications signal, for example.

Accordingly, a technical advantage of the circuits, systems and methods embodying the present invention is that they produce images representative of the received data streams with edges which appear as smooth curves.

Another technical advantage of the embodiments of the present invention is that they are expandable to meet the needs any particular signal processing environment without impacting their ability to maintain the associated data streams in real-time.

A further technical advantage of the embodiments of the present invention is that a plurality of received data streams may be manipulated either individually, as a subset, or as a whole, enabling a user to create a desired output format such that the manipulation of any particular data stream or group of data streams affects only that data stream or group of data streams, and not the other received data streams.

A still further technical advantage of the embodiments of the present invention is that they facilitate a modular design, which may be implemented within a single integrated device, which may be produced in mass quantities at a very low cost, and is fast, dense, and reliable.

The foregoing has outlined rather broadly the features of technical advantages of the present invention in order that the detailed description of the invention that follows may be better understood. Additional features on advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION OF THE INVENTION

Figure 6:
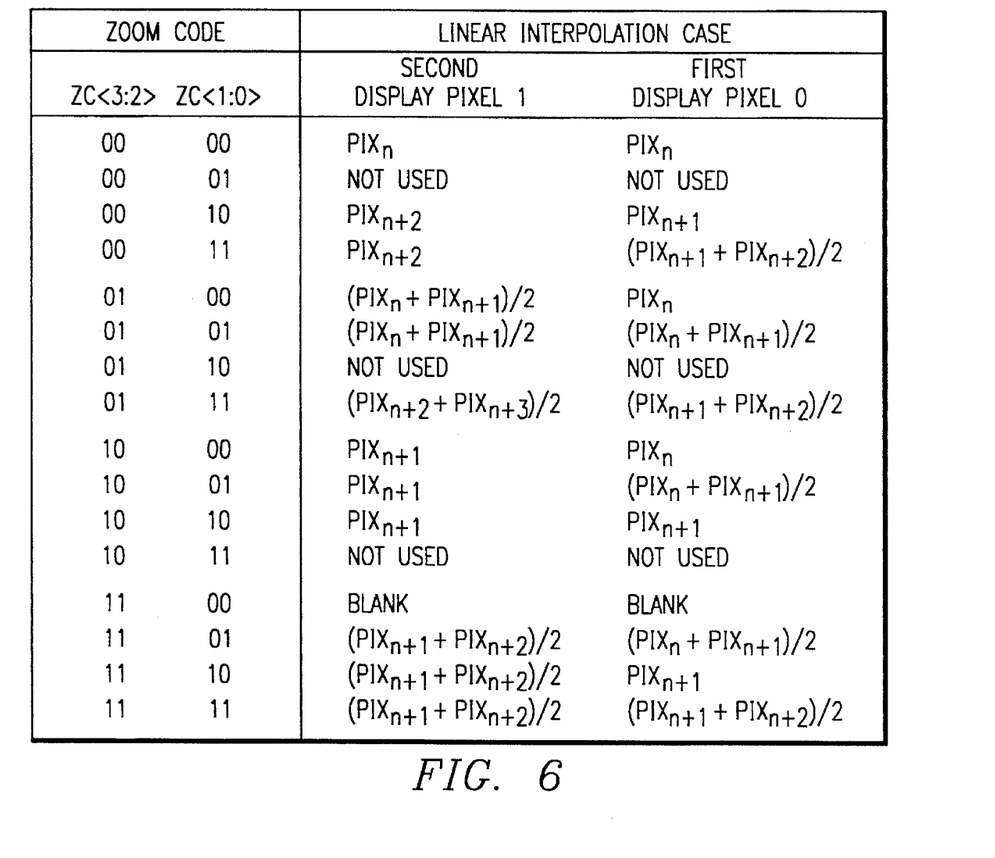
FIG. 6 is a diagram cross-referencing the zoom codes generated by the zoom code processing circuitry of FIG. 4 and the corresponding zooming operations performed by the DAC of FIG. 1.

The principles of the present invention and their advantages are best understood by referring to the illustrated embodiment depicted in FIG. 6 of the drawings, in which like numerals designate like parts.

Figure 1:
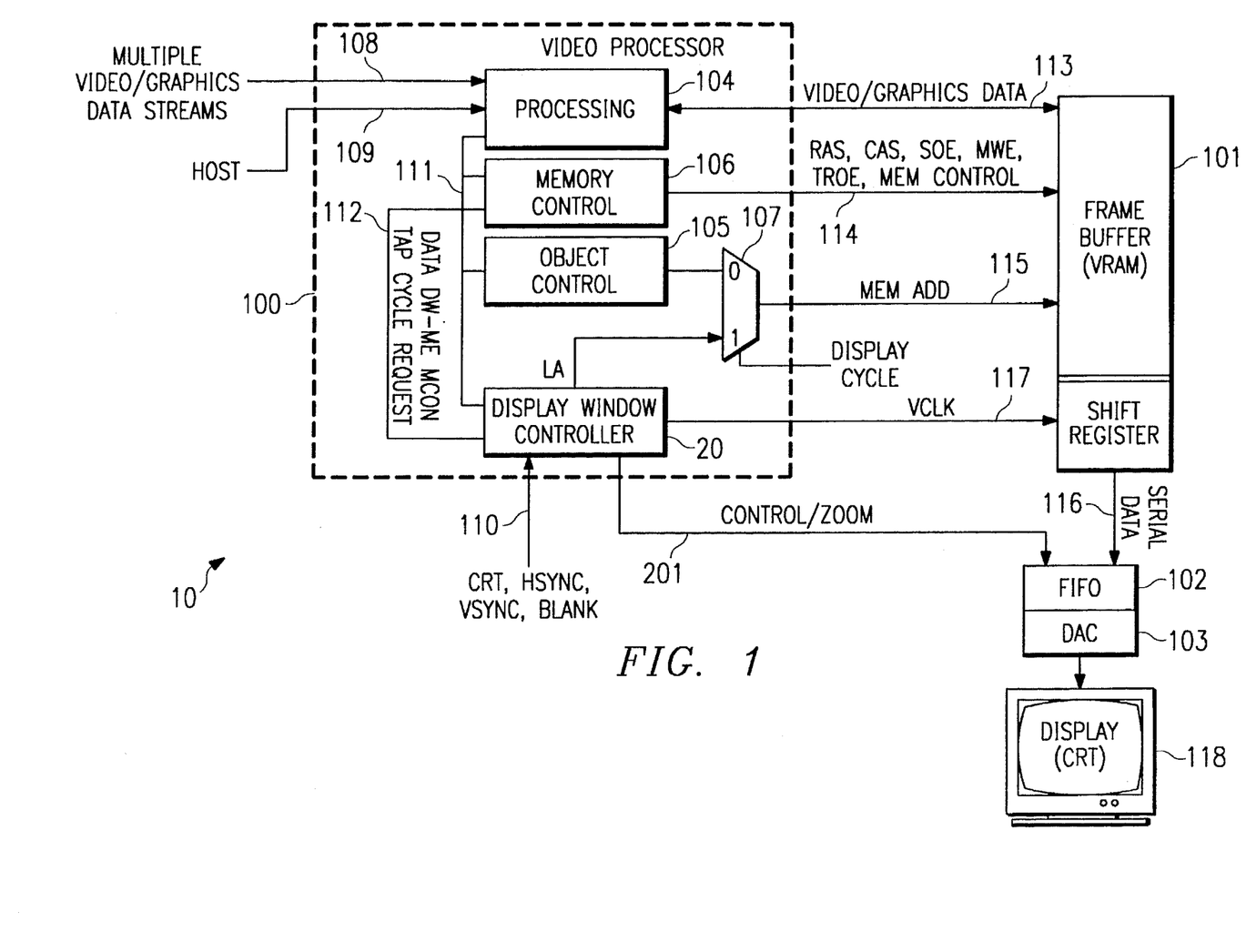
FIG. 1 is a functional block diagram of display system embodying the principles of the present invention.

Referring first to FIG. 1, a video processing system embodying the principles of the present invention is shown generally at 10. Video processing system 10 includes a video processor 100, a frame buffer 101, a first-in/first-out memory 102, a digital to analog converter (display interface) 103 and a display 104. In the illustrated embodiment, video processor 100 is a Pixel Semiconductor CL-PX2070 digital video processor. For a complete description of the Pixel Semiconductor CL-PX2070 processor, reference is now made to "Preliminary Data Sheet, CL-PX2070 Digital Video Processor," October 1992, available from Pixel Semiconductor, Dallas, Tex. Frame buffer 101 in the illustrated embodiment is composed of one or more video random access memories (VRAM). In a preferred embodiment, FIFO 102 and digital to analog converter 103 are provided as a single chip or unit which may be for example, a Pixel Semiconductor CL-PX2080 MediaDAC display interface unit. For a complete description of the CL-PX2080 memory interface device, reference is now made to "Preliminary Data Sheet, CL-PX2080 MediaDAC," December 1992 and available from Pixel Semiconductor, Dallas, Tex. In the illustrated embodiment, display 104 is a conventional raster scan (CRT) display unit which displays images as a plurality of pixels arranged in rows and columns (fields).

Video processor 100 includes processing circuitry 104, memory control circuitry 106, object control circuitry 105, multiplexing circuitry 107 and display window controller 20. Display window controller 20 will be described below in further detail.

Video processor 100 operates in association with buses 108, 109 and 110. Bus 108 carries video and/or graphics data from one or more external data sources. Bus 109 provides for the bi-directional exchange of data and control signals between video processor 100 and a host processor (not shown). Bus 109 may be, for example, an ISA bus, an MCA bus, or the host's own local bus. Bus 110 carries control signals necessary for controlling the data flow to display unit 104 such as the display blanking VSYNC, HSYNC, and signals designating the position of the CRT gun during the current scan of display 104. An internal bus 111 provides communication between processing circuitry 104, memory control circuitry 106, object control circuitry 105 and display window controller 20. A second internal bus 112 allows display window controller 20 to send memory control circuitry 106 a tap cycle request indicating that a reload of the shift register of the VRAM frame buffer 101 is required.

As discussed further below, zoom codes are transferred from display window controller 20 to first-in/first-out memory 102 via bus 201.

Processing circuitry 104 includes a host interface unit for interfacing with bus 109, a video bus unit for communication with the video/graphics sources through bus 108, a video processing unit, and a reference frame unit. For a detailed description of processing circuitry 104 and its advantages, reference is again made to the CL-PX2070 Preliminary Data Sheet as cited above.

Processing circuitry 104 passes video and graphics data to frame buffer 101 for temporary storage via bus 113. The associated memory control signals (i.e., RAS, CAS, SOE, MWE, TROE) are provided to frame buffer 101 by memory control unit 106 via bus 114. The memory addresses for storing data are received from multiplexer 107 via bus 115. During the display of a current window, object control circuitry 105 provides addresses via bus 115 to frame buffer 101 such that processing circuitry 104 can read or write data into frame buffer 101 through the VRAM random port. If however, a read transfer is required, either at the end of a scan line of pixels on display 104 or at the end of the current window, multiplexer 107 instead passes an address from display window controller 20 for reloading the VRAM shift registers.

Color data for a line of pixels on the display screen of display 104 are shifted out in serial (i.e., a raster format, in the illustrated embodiment as 32-bit wide words) via bus 116 to the front end FIFO 102 of the display interface device 103. At the same time, the associated zoom code, discussed further below, for a pixel or pair of pixels is input to FIFO 102 from bus 201.

Figure 2:
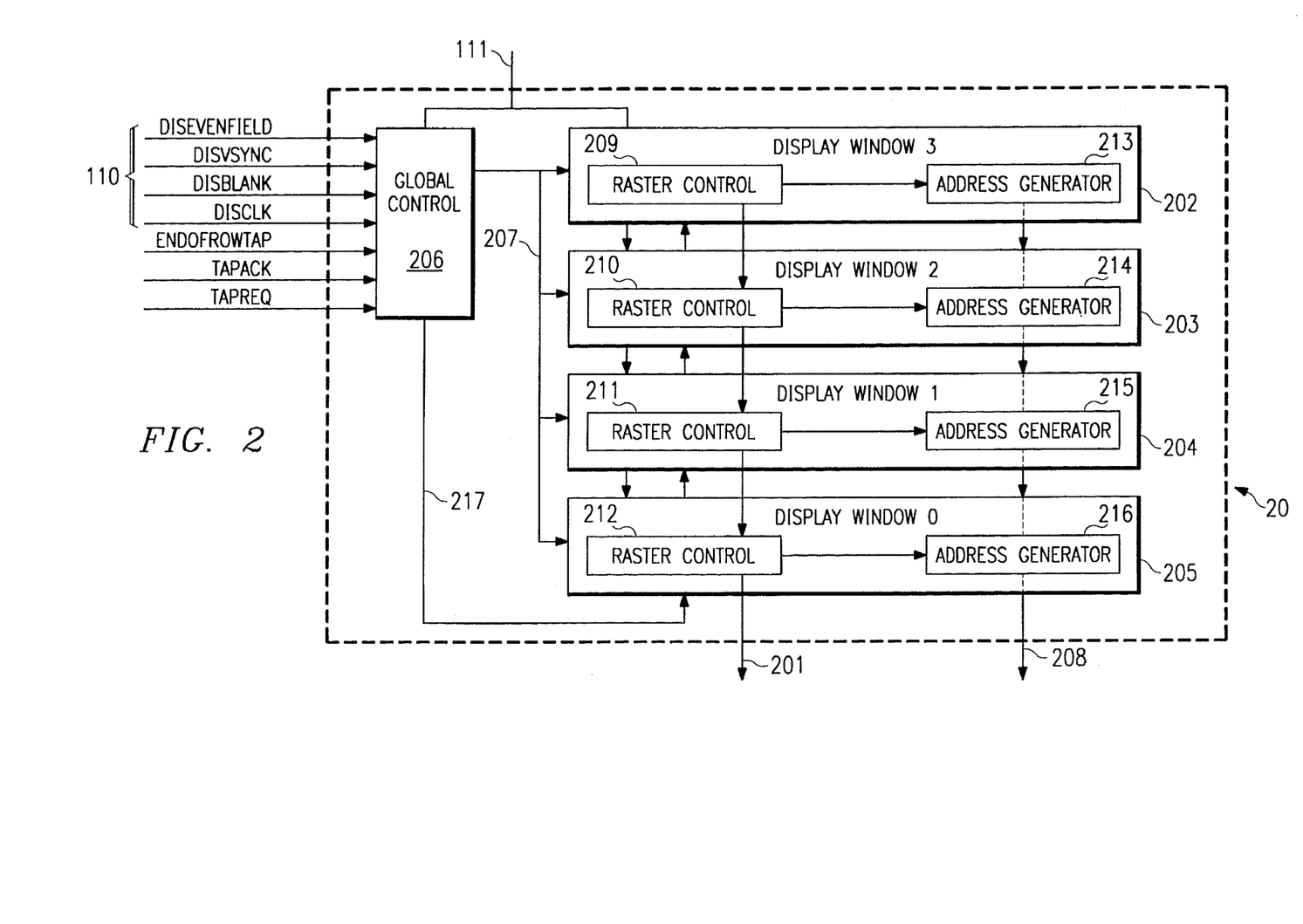
FIG. 2 is a more detailed functional block diagram of the display window controller shown in FIG. 1.

FIG. 2 is a more detailed functional block diagram of display window controller 20. In the illustrated embodiment, display window controller 20 includes four independent window managers 202–205 coupled to a global controller 206 by a bus 207. Each window manager 202–205 includes respective raster control circuitry 209–212 and address generator circuitry 213–216. The raster control circuitry 209–212 are coupled to global control circuitry 104 via a bus 217 while address generators 213–216 are coupled together by a bus 208. Bus 201, which has been previously discussed above, is coupled to the zoom code generator circuits (discussed below) found in each raster control circuit 209–212.

As discussed briefly above, read transfer cycles in VRAM 101 are initiated as the CRT gun of display 104 crosses over a pixel position corresponding to a display window boundary, such as the end of a line of pixels or the end of a window. When this occurs, display window controller 20 either receives an interrupt signal or interrupts itself, indicating that the boundary has been crossed. Display window controller 20 then generates a new address which is sent to VRAM 101 such that the shift registers of VRAM 101 are loaded from the newly addressed location. The data loaded into the shift registers is then shifted out to FIFO 207 with the controlling clock signal.

For a complete discussion of the operation of display window controller 20, reference is now made to copending and coassigned U.S. patent application Ser. No. 08/099,083, entitled "System and Method For Displaying Multiple Data Streams To A Single Display Device," and filed concurrently herewith, and incorporated herein by reference. In general however, each window manager 202–205 is responsible for the control and supervision of a single window on the display screen. Address generators 213–216 maintain the current pixel and current line addresses within the display, and are responsible for tracking the window with the highest priority. It should be noted that whichever window is active, and assigned the highest priority, the associated window manager 202–205 through its corresponding address generator 213–216, supplies the requisite address to frame buffer 101 during read transfer cycles. Raster controls 209–212 are primarily responsible for controlling the position and size of their respective windows within the desired output format on the screen of display 104. As discussed further below, raster control circuits 209–212 also each contain circuitry for generating zoom codes embodying to the principles of the present invention.

Figure 3:
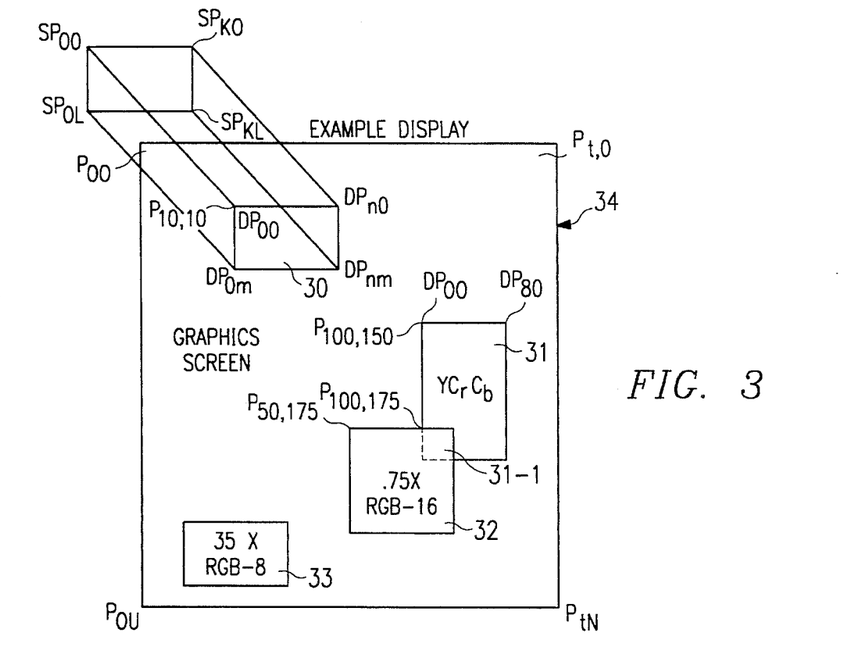
FIG. 3 is a stylized diagram of the screen of the display unit shown in FIG. 1 illustrating the mapping of source data from the frame buffer to the display screen in selected example zooming scenarios.

Prior to discussing the specifics of the zoom control code generation circuitry embodying the principles of the present invention, a brief discussion of a windowed display screen on display 104 is in order. FIG. 3 depicts an example of four video windows 30, 31, 32 and 33 contained on the screen 34 of display 104. For illustrative purposes, the windows 30–33 are shown as having varying dimensions and of being generated by varying types of graphics and video data. It should be noted, that the principles of the present invention are not limited to the dimensions and data formats shown in FIG. 3 but encompass numerous combinations thereof. In the example of FIG. 3, window 30 is a video image dimensioned one times the dimensions of the stored image residing in frame buffer 110 and is generated by 24-bit RGB data (i.e., 8-bits each of red, green and blue color data). In FIG. 3, image 31 is dimensioned 4/3 times the image stored in frame buffer 110 and is generated using $YC_rC_b$ data. Window 32, which occludes window 31 in the area 31-1, is dimensioned as 0.75 times that of the image stored in frame buffer 110 and is generated by 16-bit RGB color data (i.e., 5-bits of red and blue data and 6-bits of green data per pixel). Finally, window 33 in the example of FIG. 3 is dimensioned to be thirty-five times the stored image in frame buffer 110 and is generated by 8-bit per pixel RGB data (3-bits of each of red and green data and 2-bits of blue data per pixel).

In FIG. 3, each pixel on screen 34 has been assigned a coordinate $P_{t,u}$, where t is the horizontal coordinate and u is the vertical coordinate. Thus, in FIG. 3, the first pixel in the first line (line zero) has been assigned the coordinate $P_{00}$ while the last pixel in the first line has been assigned the coordinate $P_{t,0}$. Similarly, the first pixel in the last line has been assigned the coordinate $P_{t,u}$. The coordinates for the source pixels in the frame buffer 110 and the display windows have also been assigned coordinates. In the illustration of FIG. 3, the source pixels are designated by the coordinates $SP_{kl}$, while the pixels in the windows (the destination pixels to which the source data from the frame buffer are mapped) are assigned the coordinates $DP_{nm}$.

Using the assigned coordinates, the mapping of the source data for a given window to screen 34 can briefly be described. In the simple case of window 30, which is generated by 1-to-1 dimensioning of the source data in frame buffer 110, source pixel $SP_{00}$ is mapped to display pixel $DP_{0,0}$, $P_{10,10}$ source pixel $SP_{kl}$ is mapped directly to display pixel $DP_{nm}$. In other words, every pixel SP in the frame buffer 110 corresponds directly to a display pixel DP in window 30, since window 30 has a one times dimensioning from the data in the frame buffer 110.

Figure 5:
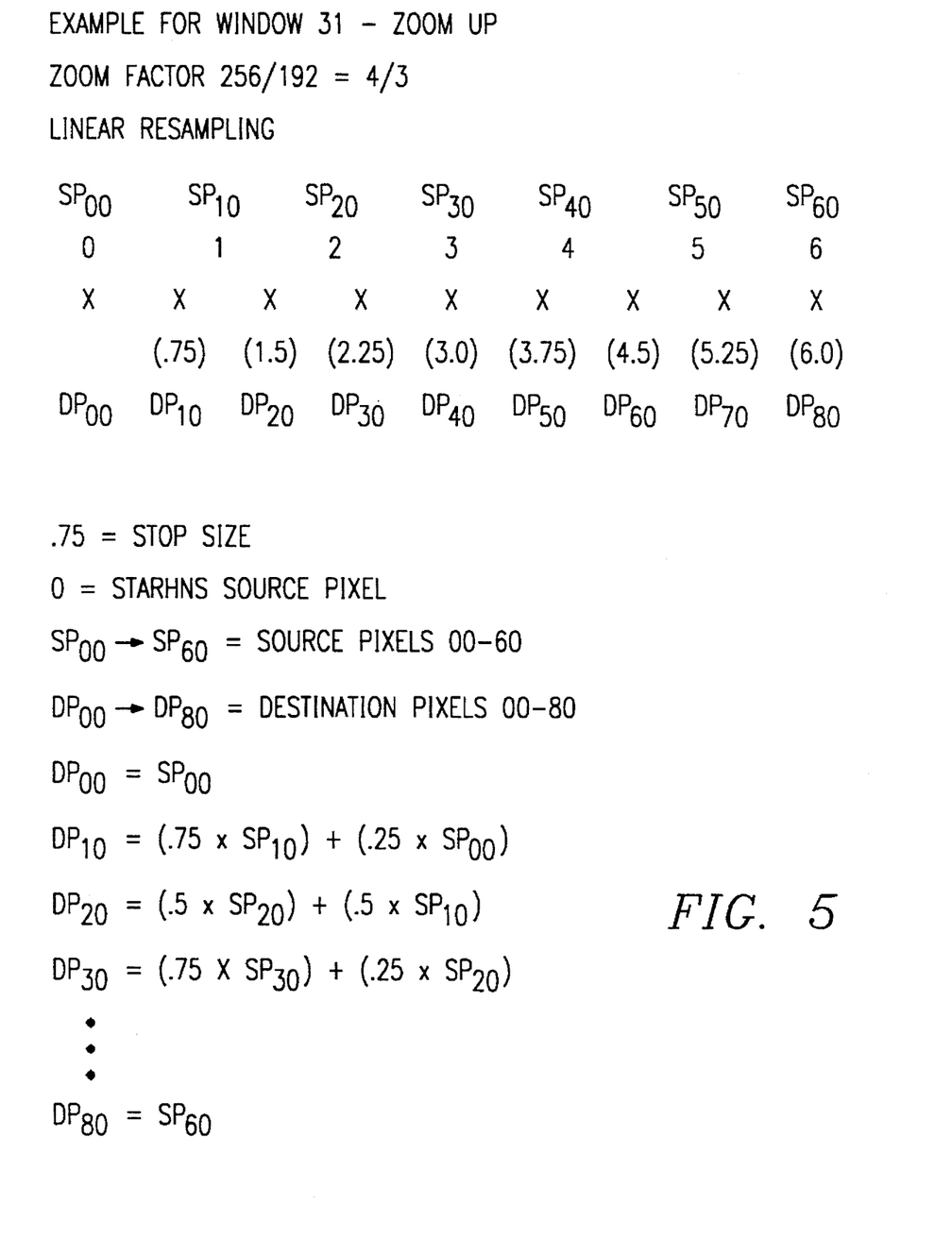
FIG. 5 is a diagram illustrating the concept of zooming up source data from the frame buffer by linear interpolation in the DAC illustrated in FIG. 1.

In the case of window 31 (FIG. 3), there is no longer a 1-to-1 correspondence between the source pixels SP and the display pixels DP since window 31 is a four-thirds zoom up (expansion) of the source pixels SP in VRAM 110. It should be noted that screen position (pixel) $P_{100,150}$ represents destination pixel $DP_{00}$ for window 32. In this example, destination pixel $DP_{00}$ is mapped, as shown in FIG. 5, to source pixel $SP_{00}$. Destination pixel $DP_{80}$ which represents the top right pixel on window 31 (i.e., the last pixel of the first line) is mapped to source pixel $SP_{60}$ in the frame buffer 110. Expansion (zooming up) of the source pixels SP in frame buffer 110 is performed such that sufficient pixel data is available to define each destination pixel DP in between.

Figure 4:
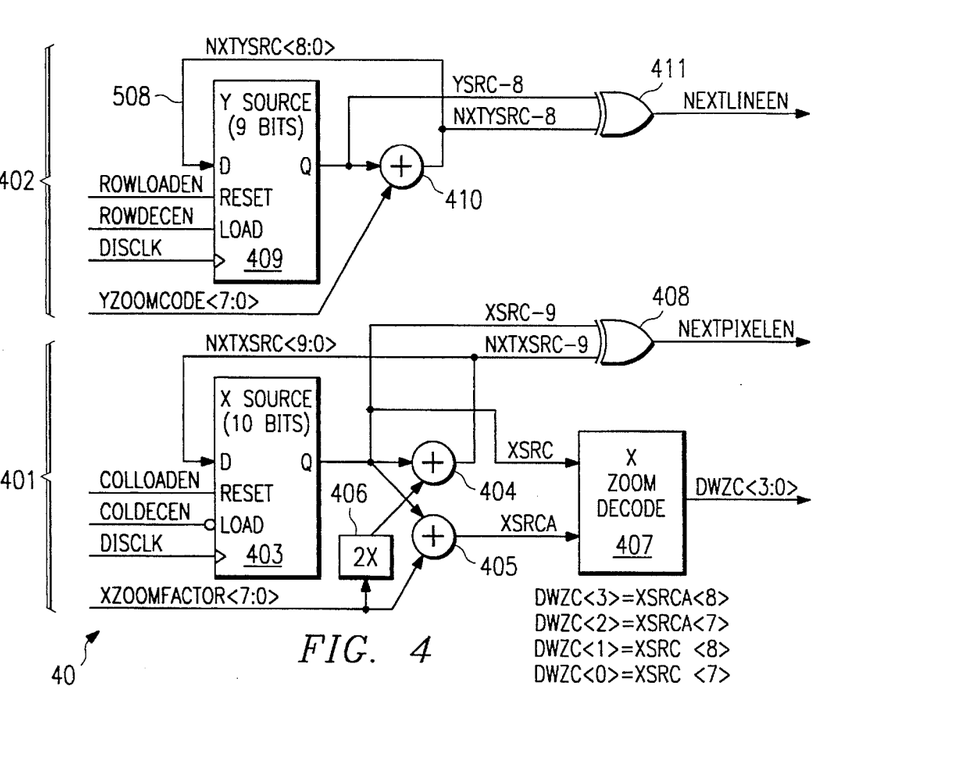
FIG. 4 is a schematic diagram of the zoom code processing circuitry portion of the raster scan control circuitry of FIG. 2.

FIG. 4 is a schematic diagram of zoom code processing circuitry 40 embodying the principles of the present invention. In the display system depicted in FIGS. 1 and 2, each raster control circuitry 209–212 includes a zoom code processing circuit 40 such as that depicted in FIG. 4. In general, zoom code generation circuitry 40: (1) controls "rough" x-direction zooming by data replication of source data for given pixels along a given display line; (2) controls y-direction zooming by data replication of the source data for all pixels of selected display lines; and (3) generates zoom codes which are passed to DAC 20 which then uses the zoom codes to perform "smooth" x-direction zooming by linear interpolation. For a more complete description of an embodiment of DAC 20 which uses zoom codes to perform zooming by linear interpolation, reference is now made to copending and coassigned U.S. patent application Ser. No. 08/099,194 incorporated herein by reference.

In the illustrated embodiment, zoom code processing circuitry 40 includes an x-source 401 for controlling x-direction zooming and a y-source for controlling y-direction zooming. X-source includes a 10-bit register 403, a pair of adders 404 and 405, zoom code decoding circuitry 407 and a comparator (exclusive OR gate) 408. Y source 402 includes a 9-bit register 409, an adder 410 and a comparator 411.

The input signals to zoom code processing circuitry 40 can be briefly described as follows. ROWLOADEN resets y-source register 409 to zero at the start of each new display field (frame) of lines. ROWDECEN increments y-source register 409 by a step value YZOOMFACTOR at the start of each new line in the field. The step factor YZOOMFACTOR is provided from the host processor and represents the multiplying factor used to zoom up the source image to generate a window. DISCLK, in the illustrated embodiment where pixels are being processed in pairs, is a divide by two of the pixel clock which times the display of each individual pixel onto screen 34. COLDECEN increments the x-source register 403 by the step value XZOOMFACTOR after a pair of pixels is output from the shift registers of frame buffer 110 to DAC 20. COLLOADEN resets the x-source register 403 to zero at the start of each new display line. XZOOMFACTOR is provided from the host processor and represents the multiplying factor used to expand the source data to generate a zoomed window. Control signals ROWLOADEN, ROWDECEN, COLDECEN, and COLLOADEN are generated by state machines in global controller 206 (FIG. 2). For a complete description, reference is now made to U.S. patent application Ser. No. 08/099,716 incorporated herein by reference.

Prior to a complete discussion of the operation of the illustrated embodiment of zoom code processing circuitry 40, the output signals will be briefly described for reference. NEXTLINEEN enables a new display line of source data to be transferred to DAC 20 (as opposed to replicating the source data for the last display line). NEXTPIXELEN enables the source data for a new pair of pixels to be transferred from the shift registers of frame buffer 110 to DAC 20 (as opposed to replicating the source data for the last pair of pixels). DWZC are a pair of two-bit zoom codes (one for each source pixel being output to DAC) from which DAC 20 performs smooth zooming.

To illustrate the operation of zoom code processing circuitry 40, the 4/3 zoom up case of window 31 of FIG. 3 will be used as an example. This example is further illustrated by reference to FIG. 5 and TABLE I. FIG. 5 depicts the relationship between the source pixels SP and the destination pixels DP, and the required steps for a 4/3 zoom up (the step size of 0.75 being the inverse of the zoom factor). FIG. 5 also depicts conceptually the interpolation base performed by DAC 20 based upon the 0.75 step size. In other words, as shown in FIG. 5, conceptually $SP_{00}$ maps directly to $DP_{00}$, $DP_{10}$ is generated as $(0.75 \times SP_{10})+(0.25 \times SP_{00})$, $DP_{20}$ is generated as $(0.5 \times SP_{20})+(0.5 \times SP_{10})$ and so on.

The operation of a preferred embodiment of the present invention is best described by referring to TABLE I. TABLE I illustrates the "rough" x-direction zooming, the generation of the corresponding zoom codes, along with the actual x-direction interpolation operation performed by DAC 20 to generate the data for the corresponding destination pixel. A complete cross-reference of the zoom codes produced by zoom code processing circuitry 40 and the resulting smooth zooming performed by DAC 20 is given in FIG. 6. It should be noted that a preferred embodiment is illustrated in TABLE I and FIG. 6 in which interpolation is performed based on the half points between the pairs of pixels. In the conceptual example of FIG. 5, the interpolation is performed using the weights 0.25 and 0.75 based on the step size of 0.75. In the preferred embodiment illustrated in TABLE I, the weights are rounded downward to the nearest half point such that the weights are always a multiple of 0.5.

In TABLE I, the processing for a new display line begins with the x-source register 403 reset to zero. In the case of a 4/3 zoom up with a step size of 0.75, the zoom factor XZOOMFACTOR is equal is 0.11 (0.75 in binary). The contents of register 403 are added to the zoom factor by adder 405 to produce NXTXSRC<9:0> and to two times the zoom factor by multiplier 406 and adder 405 to produce XSCRA<9:0>. The contents of register 403 (XSRC<9:0>) are fed directly to decoder 407 along with XSCRA<9:0>. In this case, the two inputs to decoder 407 (XSCR<9:0> and XSCRA<9:0>) are 00.00 and 00.11 respectively. It should be noted at this point that in the preferred embodiment, of the ten bits <9:0> held in register 403 two are integer bits <9:8> and the remaining eight are fraction bits <7:0>. In the illustration of TABLE I, only two fraction bits are shown for brevity and clarity, the remaining fraction bits being zero. Decoder 407 takes bits 7 and 8 of XSCR<9:0> and XCRCA<9:0> respectively to generate the corresponding zoom code (see FIG. 4) to be sent directly to DAC 20 as source pixels SP0 and SP1 are sent from the frame buffer 110 shift registers. From FIG. 6, the zoom code of 0100 results in two interpolated destination pixels SP1+SP0/2 and SP0. During cycle 0 in this example, comparator 408 determines that bit 9 of NXTXSRC<9:0> and XSRC<9:0> are equal and therefore NEXTPIXELEN is low (inactive). This indicates that the step has not gone beyond the boundaries of the next source pixels. Thus, the shift clock to the shift registers of frame buffer 110 is not enabled such that the source pixel data will be replicated (i.e., the data held at the output of the VRAM frame buffers is simply retained).

The following cycles for the display line generally follow the same processing pattern with the contents of register 403 incremented by NXTXSRC<9:0>. Further, it should be noted that in some subsequent cycles, such as cycle 1, bits 9 of NXTXSRC and XSRC are not equal and therefore NEXTPIXELEN is active thereby enabling the shift clock to shift out the next pair of pixels SP2 and SP3 for the next cycle. In other words, the cycle has gone beyond the boundary of the next source pixel.

Y-source circuitry 402 selectively performs zooming in the y-direction. Circuitry 402 performs this function by incrementing the contents of the y-source register 409 by the zoom factor YZOOMFACTOR with each new display line. The integer bit of the contents of y-source register (bit 8) of the current contents of register 409 is compared with the integer bit (bit 8) of contents incremented by the zoom factor. When the two bits are equal, the boundary of the source data for the next line has not been crossed and the shift registers are reloaded with the source data for the current line. When the two bits are not equal, the source data for the next display line is loaded into the frame buffer 110 shift registers. In other words, y-source circuitry 402 performs y-direction zooming in the illustrated embodiment by replicating lines. For example, if a zoom up of two times the image in the frame buffer 110 is desired, the pixels for a given display line as stored in frame buffer 110 will be replicated with the next display line. If a three times zoom up is desired, then the source pixels SP for a given display line in the frame buffer are repeated for the two following lines. If on the other hand, a 1.5 zoom (i.e., a three/two zoom up) is desired, y-source circuitry replicates only for every other line. For example, the data for line 1 will be replicated to produce display line 2, a source line 2 is then used to produce the third display line and is not replicated, and then source line 3 is used twice for the following two lines. Similarly, if a six/five zoom up is required, every sixth line is replicated.

Although the present invention and its advantages have been described in detail, it should be understood that various changes, substitutions and alterations can be made herein without departing from the spirit and scope of the invention as defined by the appended claims.

TABLE I

DATA FLOW FOR CIRCUIT SHOWN IN FIG. 4

| Cycle Code | XSRC | XSRCA | NXTXSRC | Zoom | Source DataH | DataL Pixel | Destination ResultH | ResultL | Next Enable |
|---|---|---|---|---|---|---|---|---|---|
| 0 | 00.00 | 00.11 | 01.10 | 0100 | SP1 | SP0 | $\frac{SP0 + SP1}{2}$ | SP0 | 0 |
| 1 | 01.10 | 10.01 | 01.00 | 0011 | SP1 | SP0 | SP2 | $\frac{SP1 + SP2}{2}$ | 1 |
| 2 | 11.00 | 11.11 | 00.10 | 1110 | SP3 | SP2 | $\frac{SP3 + SP4}{2}$ | SP3 | 1 |
| 3 | 00.10 | 01.01 | 10.00 | 1001 | SP5 | SP4 | SP5 | $\frac{SP4 + SP5}{2}$ | 1 |
| 4 | 10.00 | 10.11 | 11.10 | 0100 | SP7 | SP6 | $\frac{SP6 + SP7}{2}$ | SP6 | 0 |

Cycle = Processing cycle, one per pixel pair processed.
XSRC = X source register shown in binary form as integer fraction.
XSRCA = SXRC + ZOOMFACTOR shown in binary form as integer fraction.
NXTXSRC = Next X source register shown in binary form as integer fraction.
SOURCE = Data from VRAM to which zoom code is attached shown as pixel pair where DATAH is pixel following DATAL.
DESTINATION = Resultant pixel from interpolator within DAC. Refer to FIG. 6.
NEXTPIXELEN = Enables shift register clock on VRAM. If equal to 0, replicated data is input to FIFO with new zoom code.

What is claimed is:

1. Circuitry for altering a received data stream as a function of a received factor, said circuitry comprising:

a first circuit operable to selectively expand portions of said received data stream as a function of said received factor to produce expanded portions of said received data stream, wherein said expanded portions are in a digital format; and a second circuit operable to dynamically generate a zoom code as a function of said received factor, said zoom code providing direction to an associated device to interpolate said expanded portions of said received data stream.

2. The circuitry as set forth in claim 1 wherein said received factor is static.

3. The circuitry as set forth in claim 1 further including:

means for storing said received data stream in a memory storage device.

4. The circuitry as set forth in claim 3 wherein said memory storage device is a random access memory.

5. The circuitry as set forth in claim 1 wherein said expanded portions are representative of a video signal.

6. The circuitry as set forth in claim 5 wherein said associated device is a digital to analog conversion circuit, said digital to analog conversion circuit operable to convert each of said expanded portions from said digital format to a corresponding analog format.

7. The circuitry as set forth in claim 6 wherein said digital to analog conversion circuit is coupled with means for displaying each of said interpolated portions.

8. The circuitry as set forth in claim 1 wherein said circuitry is implemented within a computer system, and said received data stream is representative of data from a program running within said computer system or communicated to said computer system from an external source.

9. In a system for selectively altering a plurality of received data streams as a function of a plurality of received factors, each of said factors associated with at least one of said received data streams, including a processing unit operable to control the transfer of each of said received data streams to a display device, means for transforming each said received data streams, said transforming means comprising:

an expansion circuit operable to expand portions of each of said received data streams as a function of said associated factor and generate an associated dynamic zoom code as a function of said associated factor for each of said expanded portions of said received data streams, said dynamic zoom code providing direction to an associated circuit to interpolate each of said expanded portions.

10. The system as set forth in claim 9, wherein said factor is static.

11. The system as set forth in claim 9 further including:

means for storing said received data stream in a memory storage device.

12. The system as set forth in claim 11 wherein said memory storage device is a random access memory.

13. The system as set forth in claim 9 wherein said expanded portions are in a digital format.

14. The system as set forth in claim 13 wherein said expanded portions are representative of a video signal.

15. The system as set forth in claim 14 wherein each of said expanded portions is transmitted in parallel with said associated zoom code to said associated circuit wherein said associated circuit is a digital to analog conversion circuit, said digital to analog conversion circuit operable to convert each of said transmitted portions from said digital format to a corresponding analog format.

16. The system as set forth in claim 15 further including:

means coupled with said digital to analog conversion circuit for displaying each of said transmitted portions.

17. The system as set forth in claim 9 wherein said system is implemented within a computer system, and said received data stream is representative of data from a program running within said computer system or communicated to said computer system from an external source.

18. A method for altering a received data stream as a function of a received factor, said factor providing direction for displaying said received data stream, said method comprising the steps of:

selectively expanding a portion of said received data stream as a function of said received factor, wherein said expanded portion is in a digital format; and dynamically generating a distinct zoom code as a function of said received factor, said distinct zoom code providing direction for interpolating said expanded portion.

19. The method as set forth in claim 18, wherein said factor is static.

20. The method as set forth in claim 18 further including the step of:

storing said received data stream in a memory storage device.

21. The method as set forth in claim 20 wherein said memory storage device is a random access memory.

22. The method as set forth in claim 18 wherein said expanded portion is representative of a video signal.

23. The method as set forth in claim 22 further including the step of:

transmitting said expanded portion in parallel with said associated distinct zoom code to a digital to analog conversion circuitry, said digital to analog conversion circuitry operable to convert said transmitted portion from said digital format to a corresponding analog format.

24. The method as set forth in claim 23 further including the step of:

displaying said transmitted portion.

25. The method as set forth in claim 18 wherein said method is implemented within a computer system, and said received data stream is representative of data from a program running within said computer system or communicated to said computer system from an external source.

* * * * *